June 20, 1950  C. M. GOODSPEED  2,512,097
COMBINE WAGON HITCH
Filed Dec. 19, 1947  2 Sheets-Sheet 1

Carl M. Goodspeed
INVENTOR.

June 20, 1950     C. M. GOODSPEED     2,512,097
COMBINE WAGON HITCH
Filed Dec. 19, 1947     2 Sheets-Sheet 2
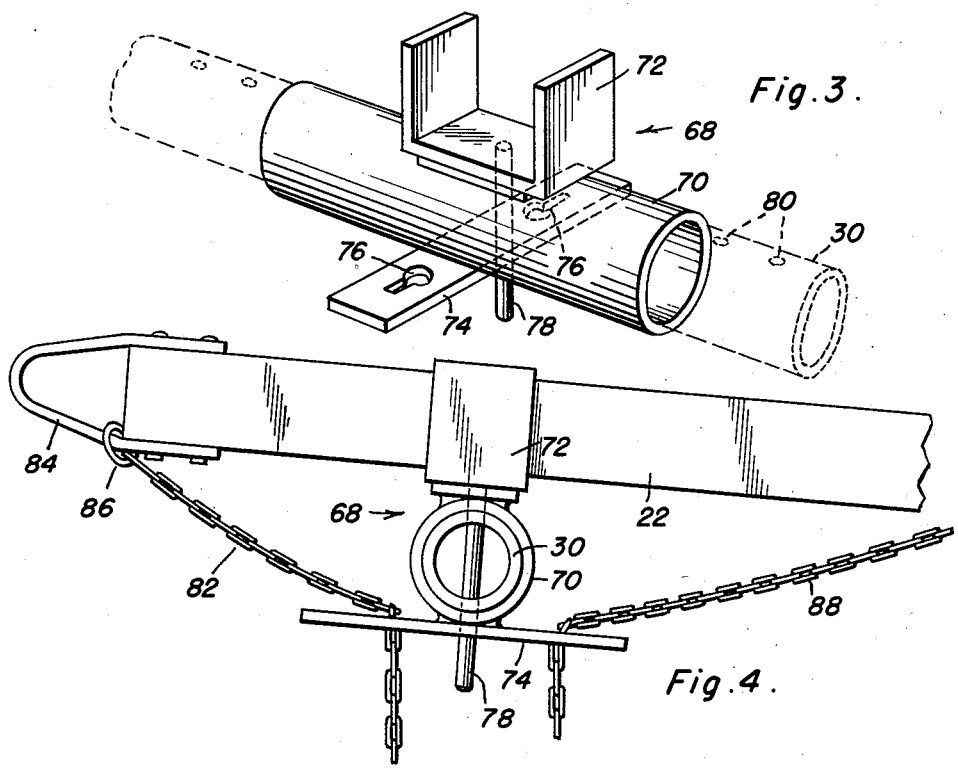
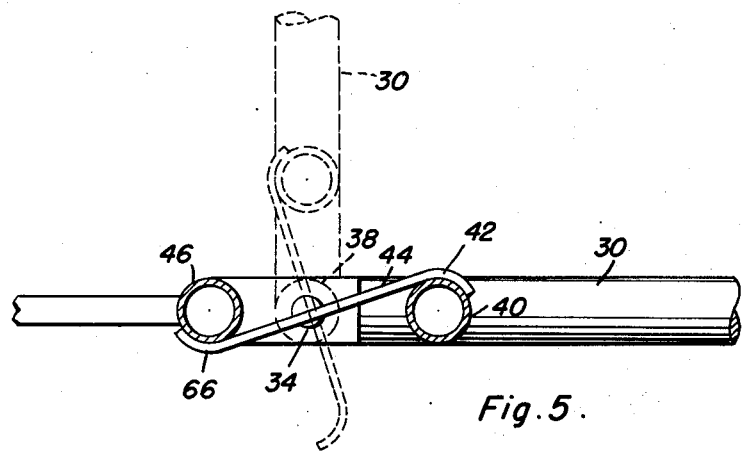
Carl M. Goodspeed
*INVENTOR.*

Patented June 20, 1950

2,512,097

UNITED STATES PATENT OFFICE 2,512,097

COMBINE WAGON HITCH

Carl M. Goodspeed, Fort Dodge, Iowa

Application December 19, 1947, Serial No. 792,677

3 Claims. (Cl. 280—33.44)

This invention relates generally to agricultural implements, and more particularly to a hitch mounted on the frame of a combine, whereby a wagon may be hitched laterally to the combine.

A primary object of this invention is to provide a hitch whereby a grain wagon may be hauled laterally of a combine during the operation thereof, so that the grain threshed may be directly deposited into the grain wagon.

Another object of this invention is to provide a hitch of the character mentioned above which allows the wagon to be very easily attached and detached from the drawbar.

Still another object of this invention is to provide a drawbar hitch assembly for a combine which may be swung upwardly to the side of the combine when not in use.

Still another object of this invention is to provide a hitch for a combine which may be adjusted for attachment thereto, thus making the same hitch usable with differently proportioned frames in different makes of combines.

Another object of this invention is to provide improved means for limiting the downward pivotal movement of the drawbar, and other means to facilitate the securing of a tongue of the wagon to be pulled at different positions on the drawbar.

Another object which is ancillary to all the foregoing objects, is to provide means by the use of which the necessity of moving the combine away from normal operation in order to unload grain is obviated.

And a last object to be mentioned specifically is to provide a device of this general character which is relatively inexpensive and practicable to manufacture, which is safe, simple and convenient to use under vary conditions, and which will give generally efficient and durable service.

With these objects definitely in view, this invention resides in certain novel features of construction, combination and arrangement of parts and portions as will be hereinafter described in the specification, particularly pointed out in the appended claims, and illustrated in the accompanying drawings which form a material part of this application, and in which:

Figure 3 is a three dimensional view of the tongue guide, a portion of the drawbar being shown in phantom lines, and the plate having bayonet slots therein positioned below the tongue guide, the figure being designed to show primarily the U-shaped structure of the tongue guide portion which actually contacts the tongue;

Figure 1:
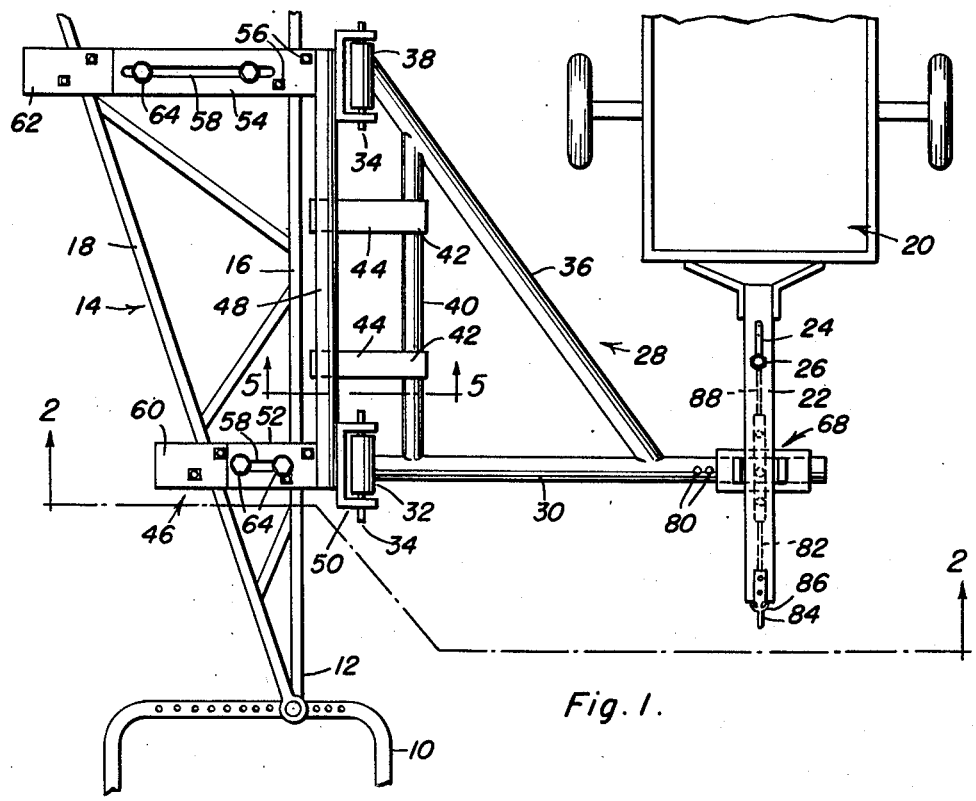
Figure 1 is a fragmentary top plan view showing a rear portion of a tractor, a forward portion of a combine frame, a forward portion of a grain wagon, and this invention operatively combined therewith.
Figure 2:
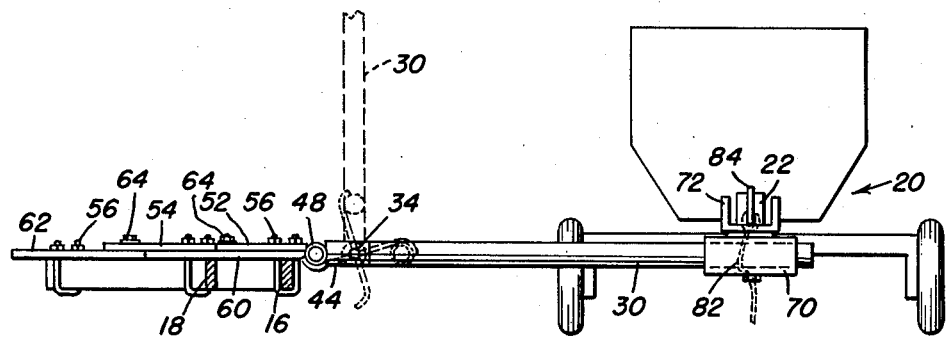
Figure 2 is a vertical sectional view, taken substantially on the line 2—2 in Figure 1, the major portions of this invention and the grain wagon being shown in front elevation.

Figure 4 is a side elevational view of a front portion of a tongue constructed according to this invention, together with a tongue guide, a tongue and the plate having the bayonet apertures; and Figure 5 is a horizontal sectional view taken on the line 5—5 in Figure 1, the figure being designed to show the construction of a stop plate incorporated with the hinge structure on the drawbar, whereby the drawbar is limited in its downward pivotal movement, the hinged end of the drawbar being shown in two positions.

Similar characters of reference designate similar elements and portions, or identical elements and portions, throughout the specification and throughout the several views of the drawings.

Referring now to the drawings in detail, the environment wherewith this invention is adapted to be used includes a tractor which will have a drawbar 10 to which is secured the forward end 12 of the frame of the combine, generally indicated by the numeral 14. This frame will ordinarily include substantially horizontal forwardly extending members 16 and 18 which may vary in size and angular disposition in different makes of combines. The environment will also include a grain wagon 20 having a tongue 22, a clevis 24 and a kingbolt with an enlarged head 26.

This invention contemplates provision of a drawbar assembly 28 including what will be referred to as the drawbar 30 terminating at the inner end in a barrel 32 disposed transversely thereof and adapted to receive a hinge pin 34, and the drawbar 30 has integrally secured thereto a brace 36 terminating at its inner end in a similar barrel 38 to receive a similar pin 34, and finally another brace 40 terminally secured to intermediate portions of the brace 36 and the drawbar 30, this brace 40 having rigidly secured thereto the end portions 42 of substantially S-shaped stop members 44.

The drawbar attachment assembly 46 includes a bar 48 having U-shaped brackets 50 secured to the ends thereof and apertured to receive the hinge pin 34 while straddling the barrels 32 and 38, and on the opposite side of the bar 48 two attachment plates 52 and 54 of different lengths comprise the means for securing the bar 48 to the combine frame member 16. It will be noted that the plates 52 and 54 are secured to the horizontal frame member 16 by U-bolts the upper ends of which are illustrated at 56, and the plates 52 and 54 are each longitudinally slotted, as at 58. A pair of coacting attachment plates 60 and 62 are similarly secured by U-bolts to the horizontal combine frame member 18 and these plates 60 and 62 are also longitudinally slotted, so that pairs of bolts 64 may be inserted through the slots in each of the pairs of plates for securement thereof against relative motion, thus firmly securing the bar 48 to the frame of the combine.

The ends 66 of the S-shaped stop members 44 are adapted to engage the bar 48 when the drawbar 30 is in substantially horizontal position. This construction is shown very clearly in Figure 5 it may here be noted that when the drawbar is not in use, the same may be tilted upwardly and moved over center to rest upon the side of the combine.

A tongue guide, generally indicated by the numeral 68, is comprised of a sleeve 70 adapted to slide longitudinally upon the outer end of the drawbar 30. Rigidly secured to this sleeve and on the upper side thereof is a U-shaped bracket 72, and on the underside of this sleeve is secured a plate 74 having a pair of bayonet slots 76 adjacent either end thereof. A pin 78 extends from the bight portion of the U-shaped member 72 downwardly and diametrically through the sleeve 70 and through the plate 74, and the drawbar 30 is provided with a plurality of regularly spaced vertically disposed holes 80, when the drawbar is in horizontal position, to receive an intermediate portion of the pin 78, thus making it possible to adjust the tongue guide longitudinally of the drawbar 30.

The tongue 22 is of special design to the extent that a chain 82 is secured to the forward end thereof by any suitable means such as a looped strap 84 and a ring 86, while another chain 88 is secured to the kingbolt 26 within the clevis 24. The forward end of the chain 88 is inserted through one of the bayonet slots 76 while the rearwardly disposed end of the other chain 82 is inserted through the other of the bayonet slots.

The operation of this invention will be clearly understood from the foregoing description of the mechanical details thereof, taken in connection with the above recitation of the objects sought to be achieved by this invention. In recapitulation, it may be added that the tongue 22 will be placed in the U-shaped member 72, whereafter the chains 82 and 88 are secured in tight relation in the bayonet slots 76. When the wagon 20 is loaded, the tongue 22 is released from the device by a reversal of the steps indicated immediately above. When the drawbar is not in use, it is obvious that the same may be tilted upwardly against the side of the combine.

It is clear that all the objects sought to be achieved by this invention are attained by the structure described herein and it should be carefully noted that minor variations may be made in this structure without departure from the spirit and scope of this invention which should be limited only as determined by a proper interpretation of the terms used in the subjoined claims.

Having described the invention, what is claimed as new is:

1. A hitch mounted on the frame of a combine whereby a wagon, having a tongue with a clevis and a kingbolt, may be hitched laterally of the combine, comprising a drawbar extending from one side of said frame, a tongue guide secured on said drawbar, a plate having bayonet slots therein carried on said drawbar adjacent said tongue guide, chains each having one end secured to longitudinally spaced apart portions of said tongue, intermediate portions of said chains being securable in said bayonet slots while an adjacent portion of said tongue is in said tongue guide, to prevent relative movement between said tongue and said drawbar, stop plates incorporated with said hinge connection to limit the downward movement of said drawbar, one of said chains having an end thereof secured to the forward end of said tongue, and the other of said chains having an end thereof securable to the kingbolt within said clevis.

2. A hitch mounted on the frame of a combine whereby a wagon, having a tongue with a clevis and a kingbolt, may be hitched laterally of the combine, comprising a drawbar extending from one side of said frame, a tongue guide secured on said drawbar, a plate having bayonet slots therein carried on said drawbar adjacent said tongue guide, chains each having one end secured to longitudinally spaced apart portions of said tongue, intermediate portions of said chains being securable in said bayonet slots while an adjacent portion of said tongue is in said tongue guide, to prevent relative movement between said tongue and said drawbar, stop plates incorporated with said hinge connection to limit the downward movement of said drawbar, one of said chains having an end thereof secured to the forward end of said tongue, and the other of said chains having an end thereof securable to the kingbolt within said clevis, said plate being disposed below said drawbar and said tongue guide being disposed above said drawbar.

3. A hitch mounted on the frame of a combine whereby a wagon, having a tongue with a clevis and a kingbolt, may be hitched laterally of the combine, comprising a drawbar extending from one side of said frame, a tongue guide secured on said drawbar, a plate having bayonet slots therein carried on said drawbar adjacent said tongue guide, chains each having one end secured to longitudinally spaced apart portions of said tongue, intermediate portions of said chains being securable in said bayonet slots while an adjacent portion of said tongue is in said tongue guide, to prevent relative movement between said tongue and said drawbar, in which said tongue guide is longitudinally adjustable on said drawbar.

CARL M. GOODSPEED.

REFERENCES CITED

The following references are of record in the file of this patent:

UNITED STATES PATENTS

| Number | Name | Date |
| --- | --- | --- |
| 1,941,670 | Everett | Jan. 2, 1934 |
| 1,992,429 | Hyman | Feb. 26, 1935 |